July 29, 1952  L. G. ALEXANDER  2,604,992
FILTER ASSEMBLY
Filed Feb. 7, 1949

Inventor
LEON G. ALEXANDER.

By Shoemaker & Mattare
ATTORNEY

Patented July 29, 1952

2,604,992

UNITED STATES PATENT OFFICE 2,604,992

FILTER ASSEMBLY

Leon G. Alexander, Charlotte, N. C., assignor to Wix Accessories Corporation, Gastonia, N. C., a corporation of North Carolina Application February 7, 1949, Serial No. 74,993

1 Claim. (Cl. 210—148)

The invention relates to a filter assembly for a filtering unit comprising an outer cylindrical shell, an inner tubular member, and end plates having a lock seam at their outer peripheries securing them to the cylindrical shell.

An object of the present invention is to provide an improved filter assembly of simple, practical and comparatively inexpensive construction for the type of filter which slips over a closely machined center post or tube and depends upon a close metal-to-metal fit between the center post and the openings in the end plates of the assembly to secure proper sealing without the use of additional gaskets, gasket retainers, etc. In a metal-to-metal sealing joint of this type the length of the joint is an important factor in reducing the amount of leakage through the joint and practical elimination of leakage. In this type of metal-to-metal joint a bearing area is required having a minimum length of five-sixteenths ($\frac{5}{16}$) of an inch.

Because of the light metal necessary for the end plates of the filter unit in order to allow lock seaming to the shell, it is not possible to extrude the end plate itself at the central opening thereof to a depth of five-sixteenths ($\frac{5}{16}$) of an inch, and it is an object of the present invention to equip the end plate with a fitting made of a separate piece of metal which, due to its small diameter, can be extruded very readily to the desired length to fit the center post and provide a proper sealing of the end plates.

Another object of the invention is to provide an accurately controlled sealing fitting which can be easily and economically produced and at the same time will act as a centering device and pilot for the center tube.

Heretofore, it was proposed to project the center tube through the end plates at both ends of the assembly and try to hold the inside diameter of the center tube to the required close tolerance. This center tube was of the lock seam type and considerable leakage resulted from the deformation due to the lock seam. Furthermore, on all machine made lock seam tubes no way has yet been found to eliminate a taper from one end of the tube to the other. The result was, therefore, that the ends of these tubes varied much more than the permissible requirements and the net result was either too tight or too loose a joint.

It is also an object of the invention to provide a novel construction of metal-to-metal joint in this type of filter unit which will not be affected by the lock seaming between the shell and the end plates and which will eliminate all variables and permit easy attainment of the required close tolerances.

A further object of the invention is to provide a sealing fitting adapted to engage the inner tube and hold the same in proper position when the unit is assembled and which will also serve as a pilot for guiding the tube into proper position in assembling the unit.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be resorted to without departing from the spirit or sacrificing any of the advantages of the invention.

Figure 1:
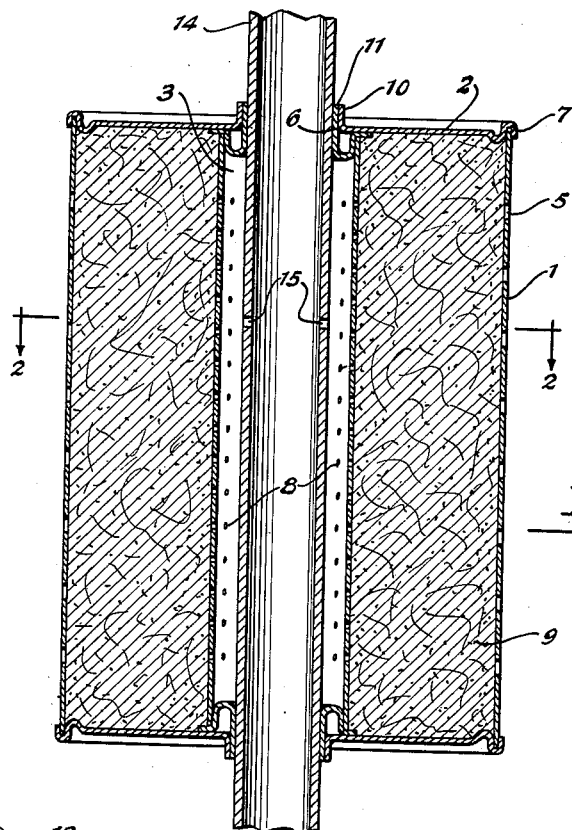
Fig. 1 is a central vertical sectional view of a filtering unit having an assembly constructed in accordance with this invention.
Figure 3:
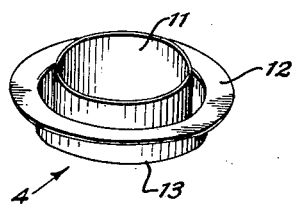
Fig. 3 is a detail perspective view of the sealing fitting.
Figure 2:
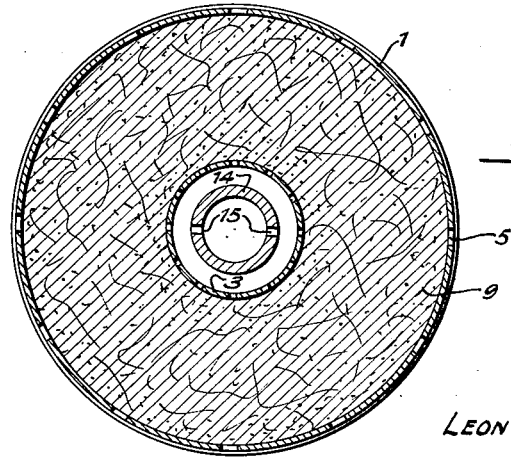
Fig. 2 is a horizontal sectional view taken on the line 2—2 of Fig. 1.

In the accompanying drawing, in which is illustrated a preferred embodiment of the invention, the filter assembly comprises in its construction an outer cylindrical shell 1, end plates 2, an inner tube 3 and sealing fittings 4. The outer shell, which is provided with perforations 5, is constructed of sheet metal or other suitable material and the end plates 2, which are imperforate except for an opening 6, are constructed of thin sheet metal and are secured at their outer peripheries to the cylindrical shell by a lock seam 7.

The inner tube 3, which is also provided with perforations 8, is constructed of sheet metal or other suitable material and the annular space enclosed or defined by the outer shell, the inner tube and the end plates, is filled with any suitable fibrous filtering material 9 adapted for filtering lubricant of the type used in lubricating systems of internal combustion engines of the automotive type, but the filtering unit may be employed for filtering liquid of any nature where a filtering unit of this character is required.

Each end plate, at its center opening, is extruded slightly to form an outwardly projecting annular flange 10 in which is fitted and secured an inner tubular sealing portion 11 of the sealing fitting 4, which is secured to the end plate before assembly. The sealing fitting which is constructed of a separate comparatively small piece of thin sheet metal comprises an outer peripheral rim 12, the said inner tubular sealing portion 11, and an intermediate annular connecting portion 13, approximately L-shaped in cross section, extending inwardly from the inner periphery of the rim 12 and radially to the inner end of the tubular sealing portion 11. The inner tubular sealing portion extends inwardly and outwardly beyond the plane of the end plate which is located approximately midway between the ends of the tubular sealing portion. Because of the relatively small size of the sealing fitting the inner tubular bearing portion may be extruded the desired or necessary length to form a proper metal-to-metal joint between the fitting and a closely mechined center post 14.

The rim of the sealing fitting fits against the inner face of the end plate 2 and the inner tubular sealing portion 11 extends outwardly into the annular flange 10 and has its outer end in flush relation with the outer edge of the flange 10. The rim 12 and the tubular bearing portion 11 may be fixedly secured to the end plate in any desired manner and the close fit between the inner tubular sealing portion 11 and the center post 14, because of the length of the sealing portion 11, provides a proper joint without the use of additional gaskets, gasket retainers, etc. Also the intermediate annular connecting portion 13, which projects inwardly from the end plate, fits within the adjacent end of the inner or center tube 3 and it forms a pilot for guiding the center tube into position in assembling the filtering unit. The intermediate connecting portion 13 of the sealing fitting forms an annular protuberance at the face of the rim 12 and by fitting into the end of the center tube the latter is maintained firmly in position when the parts are assembled.

In practice, the filtering unit will be arranged within the conventional filter casing and the lubricant will enter through the perforations 5 of the shell 1 and will pass inwardly through the filtering material and out through the perforations 8 of the inner tube and through openings 15 into the tubular center post, but the flow of lubricant may be outward, if desired, as will be readily understood.

It will be seen that the filter assembly is adapted to be readily slipped over a closely machined center post and that the metal-to-metal joint will have sufficient area to provide a proper leak-proof joint and that the filter unit may be readily removed from the center post and replaced by a similar filter unit when necessary or desirable. It will also be clear that it is not necessary to employ gaskets, packing glands and the like to provide a sealing joint between the end plates and the center post.

I claim:

A filter comprising a casing consisting of a perforated outer sheet metal shell, end plates of sheet metal having peripheral portions secured to ends of said shell and being formed with aligned center openings surrounded by outstanding annular flanges, and a tube of perforated sheet metal extending through the casing centrally thereof and surrounding the openings in the end plates in concentric spaced relation thereto; and sealing fittings at opposite ends of the casing each of a unitary sheet metal construction and consisting of a center sleeve fitting snugly within the annular flange of the adjoining end plate in tight fitting engagement with the said flange and extending inwardly from the said end plate into the perforated tube, a flat rim extending about said sleeve midway the length thereof in spaced concentric relation thereto and fitting tightly between the adjoining end of the perforated tube and the inner surface of the said end plate, and an annular connecting portion integral with the rim and the sleeve and extending from the inner periphery of the rim into the perforated tube in tight fitting engagement therewith and connected with the inner end of the sleeve by a transversely arcuate portion merging into the sleeve.

LEON G. ALEXANDER.

REFERENCES CITED

The following references are of record in the file of this patent:

UNITED STATES PATENTS

| Number | Name | Date |
|---|---|---|
| 2,126,938 | Williams, et al. | Aug. 16, 1938 |
| 2,261,098 | Wicks | Oct. 28, 1941 |
| 2,339,703 | Kamrath | Jan. 18, 1944 |
| 2,347,384 | Winslow, et al. | Apr. 25, 1944 |
| 2,468,862 | Briggs | May 3, 1949 |